(12) United States Patent
Sutardja

(10) Patent No.: US 6,594,098 B1
(45) Date of Patent: Jul. 15, 2003

(54) ACQUISTION TIMING LOOP FOR READ CHANNEL

(75) Inventor: Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 279 days.

(21) Appl. No.: 09/660,392

(22) Filed: Sep. 12, 2000

(51) Int. Cl.$^7$ ................................................. G11B 5/09

(52) U.S. Cl. .......................................... 360/65; 360/46

(58) Field of Search ....................................... 360/65, 46

(56) References Cited

U.S. PATENT DOCUMENTS

| | | | |
|---|---|---|---|
| 5,585,975 A | 12/1996 | Bliss | 360/65 |
| 5,588,011 A | 12/1996 | Riggle | 371/43 |
| 5,901,010 A | * 5/1999 | Glover et al. | 360/78.12 |
| 5,903,857 A | 5/1999 | Behrens et al. | 702/190 |
| 5,938,789 A | 8/1999 | Itoi | 714/795 |
| 5,966,258 A | * 10/1999 | Bliss | 360/46 |
| 5,987,562 A | 11/1999 | Glover | 711/4 |
| 6,381,085 B1 | * 4/2002 | Du et al. | 360/65 |

OTHER PUBLICATIONS

"Digital Baseband Transmission and Recording", Jan W.M. Bergmans, Kluwer Academic Publishers, ISBN 0–7923–9775–4, pp. 412–421.

* cited by examiner

*Primary Examiner*—David Hudspeth
*Assistant Examiner*—Varsha A. Kapadia
(74) *Attorney, Agent, or Firm*—Fitzpatrick, Cella, Harper & Scinto

(57) ABSTRACT

A signal from a storage medium is processed in a data channel to form digital data. An amplifier and a sampler convert the storage medium signal into a timed sample sequence. A first equalizer and adjuster operates to equalize the timed sample sequence and to adjust the gain of the amplifier and timing of the sampler in a preamble segment of the signal. A second equalizer and adjuster circuit to equalize the timed sample sequence for detection and to adjust the gain of the amplifier and the timing of the sampler operates in a user data segment of the signal. An FIR equalizing filter in the second equalizer and adjuster circuit is controlled by a set of parameters to accurately equalize a large range of waveforms in the user data segment of the signal and an FIR equalizing filter in the first equalizer and adjuster circuit is controlled by a smaller set of related set of parameters adapted to accommodate rapid adjustment during synchronization in the preamble segment of the signal.

36 Claims, 4 Drawing Sheets

ACQUISTION TIMING LOOP FOR READ CHANNEL

BACKGROUND OF THE INVENTION

1. Field of the Invention

This invention relates to magnetic storage systems and, more particularly, to data channels for processing signals read from a magnetic medium.

2. Description of the Related Art

During a write operation in a magnetic disk storage system, write current applied to a read-write head is modulated according to digital data to record a sequence of magnetic flux transitions in concentric tracks on a magnetic medium. In a subsequent read mode, the read-write head moving over the magnetic medium converts the magnetic transitions into an analog signal of alternating polarity. The analog signal is then detected and decoded in a read channel to reproduce the recorded digital data. While a simple peak detector may be used to detect the analog signal from the read-write head, discrete time sequence detectors that compensate for intersymbol interferences (ISI) are now employed to reduce susceptibility to noise and to increase storage capacity and reliability.

FIG. 1 illustrates a known detection and decoding arrangement using a discrete time sequence detector. In FIG. 1, there is a variable gain amplifier (VGA) 101, an analog to digital converter (ADC) 105, a finite impulse response (FIR) equalizer 110, a timing and gain control 115, a discrete time sequence detector 125 (e.g., a Viterbi detector), a decoder 128 and a host computer 130. During a read operation, a signal output of the read-write head is amplified in VGA 101 and the output of VGA 101 is converted into a sequence of timed samples in ADC 105. The sample sequence is equalized in FIR equalizer 110 and equalized sample sequence is supplied to the discrete time sequence detector 125 which provides time sequence detection. The detected sequence is then converted into digital data in the decoder 128 and the decoded digital data is supplied to the host computer 130.

As is well known, the FIR filter equalizer 110 in FIG. 1 employs a set of parameter signals to compensate for variations in magnetic and electrical characteristics over the magnetic disk, disk angle and environmental conditions. The output of the FIR equalizer 110 is also applied to the timing and gain control 115 which operates to provide signals for adjusting the timing of samples in the ADC 105 and the gain of the VGA 101. During the equalization of user data, the timing and gain control 115 receives the sample sequence output of the FIR equalizer 110 and provides signals to maintain proper amplitude in VGA 101 and proper timing for sampling of signals in the ADC 105. Prior to the user data reading, a preamble pattern is read to synchronize the sampling of the analog waveform in ADC 105 and to initially adjust the gain of the variable gain amplifier 101 using the FIR equalizer output.

FIG. 2 shows an exemplary FIR equalizer having an n tap delay that may be used in the circuit of FIG. 1. As shown in FIG. 2, the FIR equalizer includes delays 201-0 through 201-n+1, multipliers 205-0 through 205-n+1 and an adder 207. The output sample sequence from the ADC 105 in FIG. 1 is supplied to the input of the delay 201-0 and is sent through the serially arranged delays 201-0 through 201-n+1. The output of each delay is also applied to an associated one of multipliers 205-0 through 205-n+1 which multipliers also have equalizer coefficient inputs C0 through Cn+1, respectively, applied thereto. The values of the coefficients C0 through Cn+1 are previously determined from least mean square estimation obtained by having the FIR equalizer provide predetermined targets for a range of waveforms read from the magnetic disk. Arrangements for generating the FIR equalizer coefficients for least mean square (LMS) adaptive FIR filters are disclosed in "Digital Baseband Transmission and Recording", Jan W. M. Bergmans, Kluwer Academic Publishers (ISBN 0-7923-9775-4).

In order to perform accurate equalization of a large range of input waveforms, an FIR equalizer having a large number of taps (e.g., 10–20) is required and the delay through or latency in the FIR equalizer may be 10 to 20 cycles or more. The tracking of the timing and gain by the timing and gain control 115 during reading of user data is not usually affected by the latency since the bandwidth for timing and gain changes during the data reading is ordinarily relatively low. In the initial acquisition period during which a synchronization pattern is read, however, large changes in timing and gain can be expected. These large changes require a high bandwidth timing and gain control loop. In the initial synchronization period of the read channel, the large latency in the FIR equalizer 110 having 10 to 20 delay taps operates to slow down the timing and gain adjustments and may cause instability.

U.S. Pat. No. 5,585,975 issued to William G. Bliss Dec. 17, 1996 discloses an equalization scheme for sample value estimation and sequence detection in a sampled amplitude read channel in which a pair of serially connected programmable discrete time filters equalizes signal samples into desired equalization. The first equalizer estimates sample values and a second equalizer provides for sequence detection of digital data. The timing and gain control loop for the equalization scheme includes the first equalizer that operates during both the preamble and-user data segments of a sector signal so that long latency in the first equalizer adapted to equalize user data waveforms affects the timing and gain loop bandwidths during the preamble segment.

U.S. Pat. No. 5,903,857 issued to Richard T. Behrens et al. May 11, 1999 discloses an arrangement for calibrating an analog filter in a sampled amplitude read channel wherein an analog filter precedes an analog to digital converter in a series circuit having a discrete equalizer FIR filter. A timing recovery loop includes the FIR filter used for both preamble and user data so that the FIR filter latency affects the timing loop operation. Accordingly, there is a problem in providing rapid and stable synchronization in read channels having multi-tap FIR filter equalizers adapted to equalize a wide range of waveforms.

SUMMARY OF THE INVENTION

The invention is directed to a data channel for processing a signal from a storage medium in which a timed sample sequence is formed in response to the storage medium signal. A filtering unit equalizes the timed sample sequence in response to a set of parameter signals and a control unit controls the forming of the timed sample sequence in response to the equalized time sample sequence from the filtering unit.

According to the invention, a first filtering unit equalizes the timed sample sequence during a first signal segment in response to a first number of parameter signals and a first control unit controls forming of the timed sample sequence in the first signal segment. A second filtering unit equalizes the timed sample sequence during a second signal segment in response to a second number of parameter signals and a second control unit controls forming of the timed sample sequence in the second signal segment.

According to one aspect of the invention, the number of first parameter signals is smaller than the number of second parameter signals.

According to another aspect of the invention, each first parameter signal is a linear combination of at least some of the second parameter signals.

According to yet another aspect of the invention, the first filtering unit and the second filtering unit both provide substantially the same equalized timed sample sequence for the signal of the first signal segment.

According to yet another aspect of the invention, the number of first parameter signals is at least two.

According to yet another aspect of the invention, the second parameter signals includes a set of second FIR equalizer coefficient signals c0, c1, c2, ... cn, cn+1 and the first parameter signals includes a set of first FIR equalizer coefficient signals K0=f(c0, c2, c4, ... cn,), K1=f(c1, c3, c5, ... cn+1).

According to yet another aspect of the invention, the first FIR equalizer coefficient signals which form substantially the same equalized timed sample sequence as the second FIR equalizer coefficients for the signal of the first signal segment are K0=c0−c2+c4−c6 ... +cn−2−cn
K1=c1−c3+c5−c7 ... +cn−1−cn+1.

According to yet another aspect of the invention, the first FIR equalizer coefficient signals K0 and K1 are formed in an initial portion of the first signal segment.

According to yet another aspect of the invention, the first signal segment includes a 4T sinusoid pattern and the timed sample sequence during the first signal segment includes a sequence of samples having values (s0, s1, −s0, −s1, ... ). The target output equalized timed signal sequence of the first FIR equalizer for the first signal segment is of the form (xo, x1, −x0, −x1, ... ). The first FIR equalizer coefficient signals that provide substantially the same response as the second FIR equalizer filter to the first signal segment are set to be k0=(K0*x1+K1*x0)/(x0*x0+x1x1) and k1=(K1*x1+K0*x0)/(x0*x0+x1x1).

According to yet another aspect of the invention, the timed sample sequence forming unit includes an amplifier and a sampling unit. The first control unit is responsive to the equalized timed sample sequence from the first filtering unit to control the gain of the amplifier and the timing of the sampling unit during the first signal segment and second control unit is responsive to the equalized timed sample sequence from the second filtering unit to control the gain of the amplifier and the timing of the sampling unit during the during the second signal segment.

In an embodiment of the invention, a signal from a read/write head amplified in a variable gain amplifier is periodically sampled in an analog-to-digital converter to form a time sample sequence. During a preamble segment of the signal, an first FIR filter equalizes the time sample sequence in response to a first set of FIR coefficients and first timing and gain control units control the gain of the variable gain amplifier and the timing of the sampling in response to the equalized preamble output of the first FIR filter. In a data segment of the signal, a second FIR filter equalizes the time sample sequence in response to a second set of FIR coefficients. Second timing and gain control units control the gain of the variable gain amplifier and the sampling in response to the equalized data output of the second FIR filter. The second set of FIR coefficients for the data segment are c0, c1, c2, ... cn, cn+1. The first set of FIR coefficients for the preamble segment are K0=c0−c2+c4−c6 ... +cn−2−cn and K1=c1−c3+c5−c7 ... +cn−1−cn+1 to provide substantially the same equalized time sample sequence as the second set of FIR coefficients for the preamble segment. The FIR equalizer coefficient signals K0 an K1 are formed in the initial portion of the preamble segment.

In another embodiment of the invention, the preamble segment includes a 4T sinusoid pattern in which the timed sample sequence has a sequence of values (s0, s1, −s0, −s1, ... ). The target output equalized timed sample sequence of the first FIR filter for the preamble signal segment is (xo, x1, −x0, −x1, ... ) and the first FIR equalizer coefficient signals that provide substantially the same response as the second FIR equalizer filter to the preamble signal segment are set to be k0=(K0*x1+K1*x0)/(x0*x0+x1x1) and k1=(K1*x1+K0*x0)/(x0*x0+x1x1) during an initial portion of the preamble segment. The FIR equalizer coefficient signals k0 and k1 are formed in the initial portion of the preamble segment.

A fuller understanding of the invention will become apparent and appreciated by referring to the following description and claims taken in conjunction with the accompanying drawings.

DESCRIPTION OF THE PREFERRED EMBODIMENTS

Figure 6A:
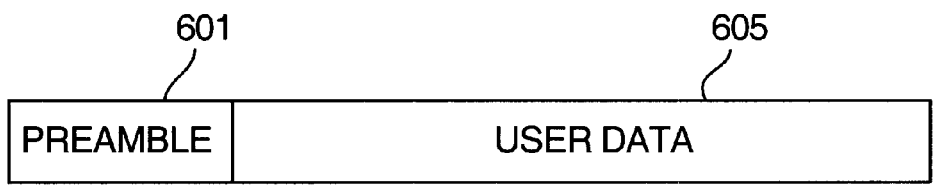
FIG. 6A illustrates the data format of a data sector to be read by the read channel of FIG. 1 or 3.
Figure 6B:
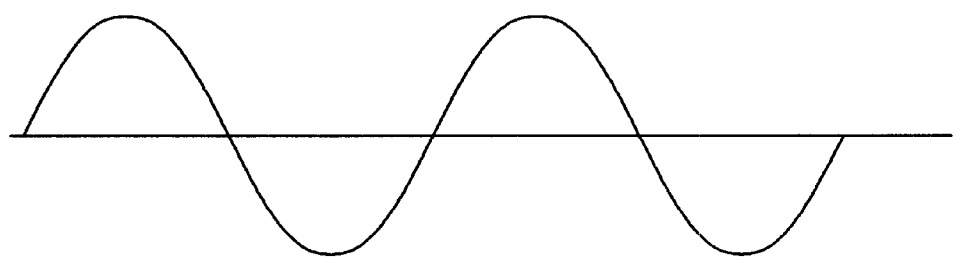
FIG. 6B shows a 4T pattern in a preamble segment of the data sector of FIG. 6A.

FIG. 6a illustrates an exemplary data format of a data sector on a magnetic disk to be read by a read/write head. The data sector includes a preamble segment 601 and a user data segment 605. As aforementioned, the magnetic patterns in the user data segment may produce a large range of waveforms that necessitate a large (e.g., 10 to 20 stage) FIR filter for equalization. Since synchronization of the read channel is completed in the preamble period preceding the data segment period, the bandwidth required for control of timing and gain in the channel for the data segment period is relatively low and unaffected by the long latency period or delay through the filter. During the preamble period, high bandwidth is needed for synchronization to accommodate rapid changes so that the latency through the large FIR equalizing filter may cause excessive delay and/or instability in the timing and gain control. The preamble period, however, utilizes a relatively simple pattern for synchronizing the read channel such as a 4T pattern shown in FIG. 6b. According to invention, a separate timing and gain control loop using an FIR filter having short latency is employed for the synchronizing pattern in the preamble segment to provide rapid synchronization and avoid read channel instability.

For a 4T sinusoid preamble pattern sampled with an arbitrary starting phase, the preamble sequence is {s0, s1, −s0, −s1, s0, s1, . . . }. To obtain proper data detection, the large FIR filter is programmed so that its output is as close to an ideal target {x0, x1, −x0, −x1, x0, x1, . . . } as possible. The large FIR filter is then optimized to provide coefficients c0, c1, c2, c3, c4, . . . cn for a proper synchronizing effect. The resulting FIR coefficients c0, c1, c2, c3, c4, . . . cn, however, cannot be predicted in advance because of signal variation for different sectors. An FIR filter having a reduced number of coefficients may be constructed that tracks the change in the FIR coefficients.

The response H(D) for the large FIR filter is $$H(D) = c0 + c1*D + c2*D2 + \ldots cn*Dn$$

where $Dn(f) = \epsilon^{(-j*2*\pi*f*T*n)}$

For a synchronization field having a 4T period, f=F/4=1/(4T) and $$Dn(f=0.25F) = \epsilon^{(-j*2*\pi*(1/(4T))*T*n)} = \epsilon^{(-j*\pi*n/2)} = \cos(\pi*n/2) - j*\sin(\pi*n/2);$$

cos(π*n/2)=1 for n=0, 0 for n=1, −1 for n=2, 0 for n=3, 1 for n=4, 0 for n=5, −1 for n=6, 0 for n=7, etc.
sin(π*n/2)=0 for n=0, 1 for n=1, 0 for n=2, −1 for n=3, 0 for n=4, 1 for n=5, 0 for n=6, −1 for n=7, etc.

therefore, the filter function is $$H(f=0.25F) = (c0-c2+c4-c6 \ldots) + j(c1-c3+c5-c7 \ldots) = K0 + j*K1 \quad (1)$$

Figure 1:
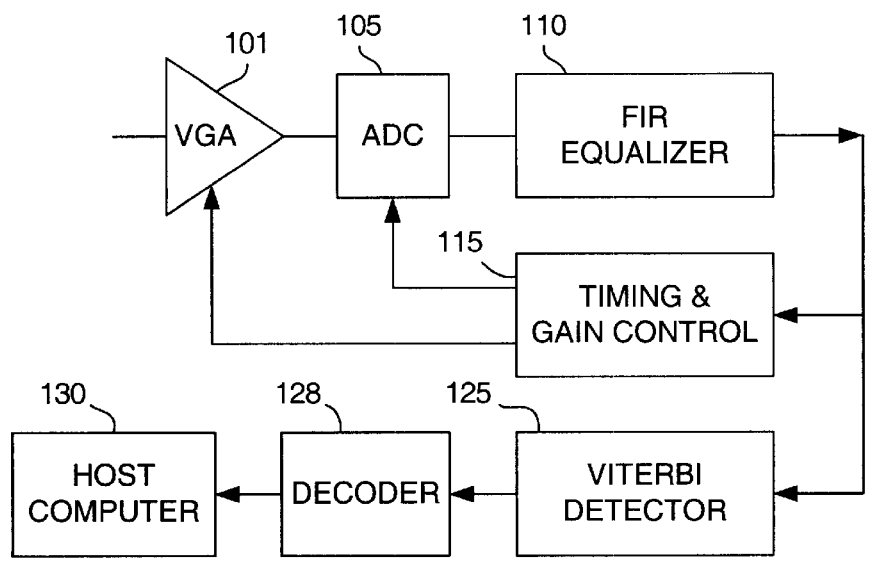
FIG. 1 depicts a block diagram of a read channel in a magnetic storage system according to the prior art.
Figure 2:
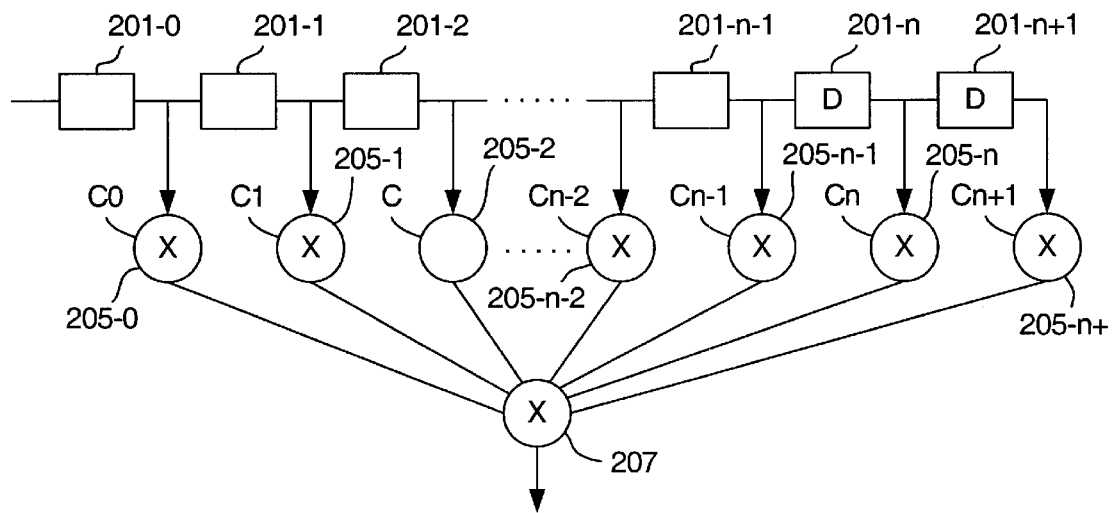
FIG. 2 shows a block diagram of an FIR equalizing filter arrangement according to the prior art.
Figure 4:
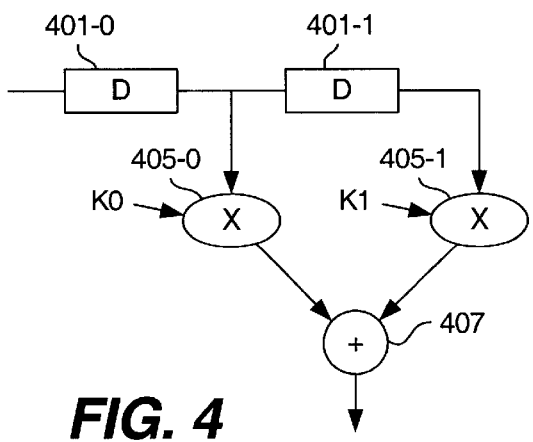
FIG. 4 shows a schematic diagram of one acquisition FIR equalizing filter that may be used in the read channel of FIG. 3.

In accordance with equation 1, a filter having values K0 and K1 has the same transfer function at the 4T preamble frequency as the large FIR filter. As a result, a 2 tap filter with FIR coefficients K0 and K1 shown in FIG. 4 where K0=c0−c2+c4−c6 . . . +cn−2−cn
K1=c1−c3+c5−c7 . . . +cn−1−cn+1.

provides the same transfer function for the filter with FIR coefficients c0, c1, c2, c3, c4, . . . cn for the 4T preamble frequency. Such a filter is shown in FIG. 4. Referring to FIG. 4, the two tap filter therein has delays 401-0 and 401-1, multipliers 405-0 and 405-1 and a summer 407. A timed sample sequence is applied to the delay 401-1 and therefrom to delay 401-1. The output of delay 401-0 is multiplied by the coefficient K0 in the multiplier 405-0 and the output of delay 401-1 is multiplied by the coefficient K1 in the multiplier 405-1. The outputs of multipliers 405-0 and 405-1 are summed in the summer 407. Advantageously, the two tap filter of FIG. 4 has a substantially shorter latency than the FIR filter of FIG. 2.

Another two tap filter may also be constructed based on phase rotation for a 4T period input sequence {x0, x1, −x0, −x1, x0, x1, −x0, −x1 . . . }, to obtain an output sequence 1, 0, −1, 0, 1, 0, −1, . . .

which has coefficients b0=x1/m
b1=−x0/m where m=x0*x0+x1*x1

The output of the filter (b0,b1) for the input sequence={x0, x1, −x0, −x1, . . . } is {x0, x1, −x0, −x1, x0, x1, −x0, −x1 . . . }*(b0, b1)=b0*x0,
b0*x1, −b0*x0, −b0*x1, b0*x0 . . . +) . . . b1*x0,
b1*x1, −b1*x0, −b1*x1, b0*x0 . . . = . . . , A, B, −A,
−B, . . .

where A=b0* x1+b1*x0=(x1*x1+x0*x0)/m=1
B=−b0*x0+b1*x1=0/m=0

Thus, an unequalized signal {s0, s1, −s0, −s1 . . . } which can be equalized to {x0, x1, −x0, −x1 . . . } using a 2-tap filter with coefficients (K0,K1), the {s0, s1, −s0, −s1 . . . } sequence can be directly equalized to an {1, 0, −1, 0 . . . } sequence using the cascaded filter $$(K0,K1)*(b0, b1) = (K0*b0, K1*b0+K0*b1, K1*b1) \quad (2)$$

Figure 5:
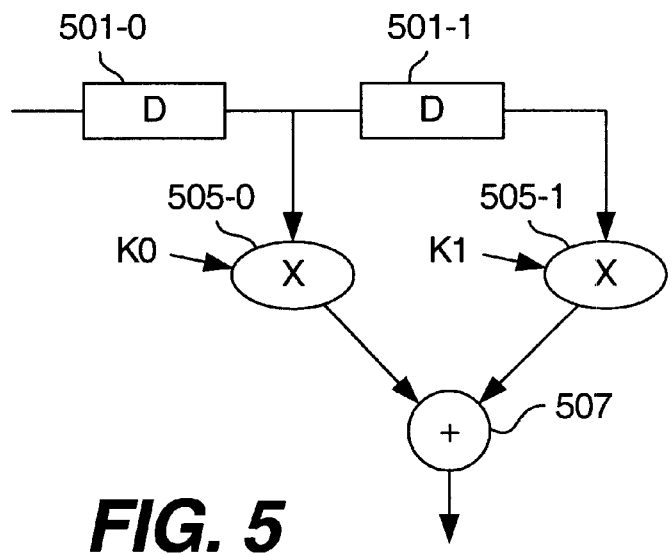
FIG. 5 shows a schematic diagram of another acquisition FIR equalizing filter that may be used in the read channel of FIG. 3.

Since only a two tap filter is needed to provide the phase rotation of {s0, s1, −s0, −s1 . . . } to {x0, x1, −x0, −x1 . . . }, the two tap FIR filter shown in FIG. 5 in which the FIR coefficients are $$k0 = K0*b0 - K1*b1 = (K0*x1+K1*x0)/(x0*x0+x1*x1)$$

$$k1 = K1*b0 + K0*b1 = (K1*x1-K0*x0)/(x0*x0+x1*x1)$$

may be used.

Referring to FIG. 5, the two tap filter therein has delays 501-0 and 501-1, multipliers 505-0 and 505-1 and a summer 507. A timed sample sequence is applied to the delay 501-0 and therefrom to delay 501-1. The output of delay 501-0 is multiplied by the coefficient k0 in the multiplier 505-0 and the output of delay 501-1 is multiplied by the coefficient k1 in the multiplier 505-1. The outputs of multipliers 505-0 and 505-1 are summed in the summer 507. As discussed with respect to FIG. 4, the two tap filter of FIG. 5 has a substantially shorter latency than the FIR filter of FIG. 2.

Figure 3:
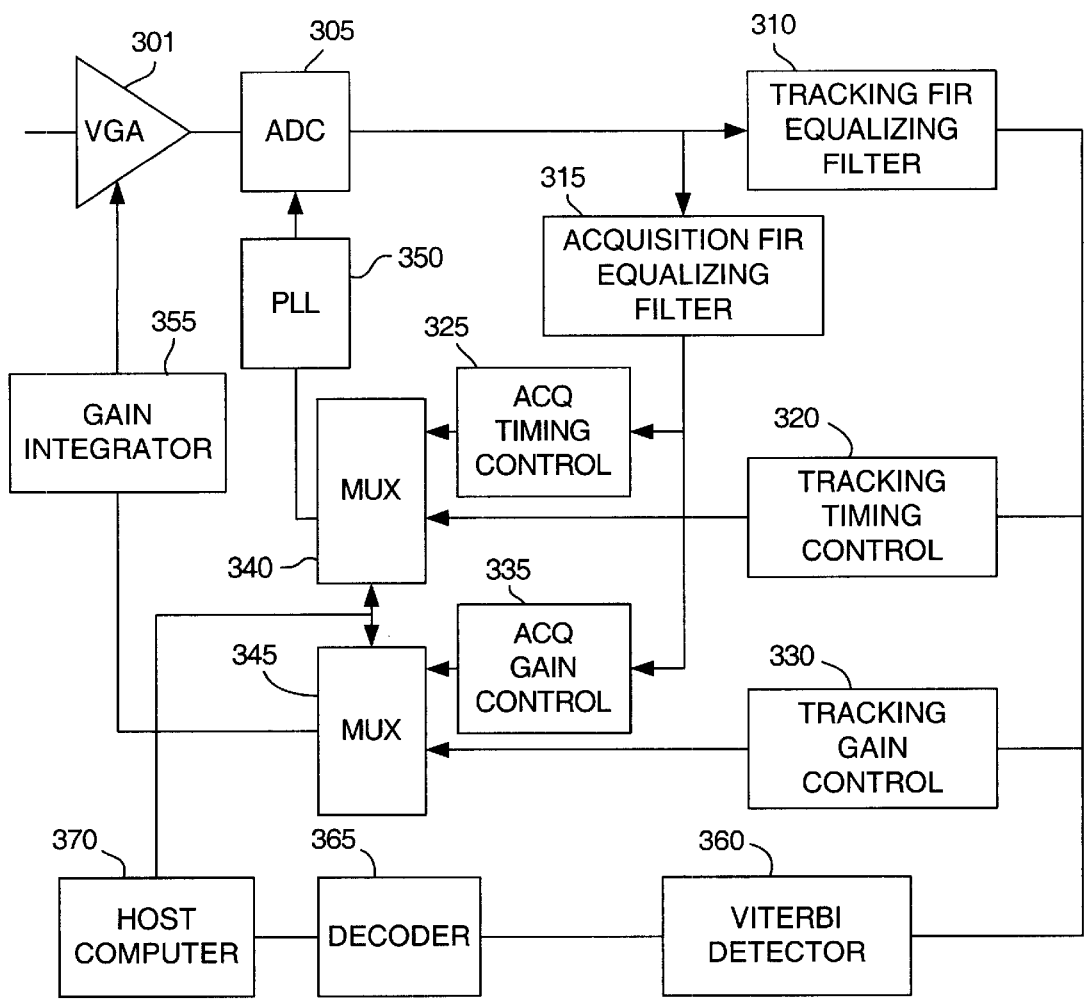
FIG. 3 depicts a block diagram of a read channel in a magnetic storage system illustrative of the invention.

FIG. 3 depicts a block diagram of a read channel according to an embodiment of the invention. In FIG. 3, there is a variable gain amplifier (VGA) 301, a sampling type analog to digital converter (ADC) 305, a tracking finite impulse response (FIR) equalizing filter 310 (e.g., the FIR filter shown in FIG. 2), a discrete time sequence detector 360 (e.g., a Viterbi detector), a decoder 365, a host computer 370, a tracking timing control 320, a tracking gain control 330, an acquisition FIR equalizing filter 315 (e.g., the FIR filter shown in FIG. 4 or FIG. 5), an acquisition timing control 325, an acquisition gain control 335, multiplexors 340 and 345, a phase locked loop 350 and a gain integrator 355.

The output of the VGA 301 is coupled to the input of the ADC 305 and the output of the ADC is coupled to the inputs of both the tracking FIR equalizing filter 310 and the acquisition FIR equalizing filter 315. The output of the tracking FIR equalizing filter 310 is connected to the inputs of the tracking timing control 320, the tracking gain control 330 and the discrete time sequence detector 360. The output of the discrete time sequence detector 360 is coupled to the host computer 370 through the decoder 365. The output of the acquisition FIR equalizing filter 315 is coupled to the inputs of the acquisition timing control 325 and the acquisition gain control 335. The outputs of the tracking timing control 320 and the acquisition timing control 325 are connected to the inputs of multiplexor 340 and the outputs of tracking gain control 330 and acquisition gain control 335 are connected to the input of the multiplexor 345. The multiplexors 340 and 345 have control inputs from a control terminal of the host computer 370. multiplexor 340 is coupled to the phase locked loop 350 which is connected to a timing control input of ADC 305. The multiplexor 345 is coupled to the gain integrator 355 which is connected to a gain control input of VGA 301.

At the start of reading a data sector, the signal pattern of the preamble segment 601 is first applied to the read channel. In reading the preamble segment, the multiplexors 340 and 345 are controlled by the host computer 370 to connect the output of the acquisition timing control 325 to the PLL 350 and the output of the acquisition gain control 335 to the gain integrator 355. The frequency of the PLL phase locked loop 350 and the gain control output of the gain integrator 355 are set at their initial values. Where the two tap filter of FIG. 4 is utilized as the acquisition FIR equalizing filter, The FIR coefficients K0 and K1

K0=c0−c2+c4−c6 . . . +cn−2−cn

K1=c1−c3+c5−c7 . . . +cn−1−cn+1 are initially formed in the host computer 370 from the FIR coefficients c0, c1, c2, c3, c4, . . . cn, cn+1. The two coefficient signals K0 and K1 are applied to the acquisition FIR filter 315. Alternatively, the two tap filter of FIG. 5 may be used in which case the coefficients K0, K1 are first generated in the initial portion of the preamble segment and the coefficients k0 and k1 are formed according to $$k0=(K0*x1+K1*x0)/(x0*x0+x1x1)$$

$$k1=(K1*x1+K0*x0)/(x0*x0+x1x1).$$

The coefficients k0 and k1 are applied to the coefficient inputs of the acquisition filter 315.

The signal output from the VGA 301 is sampled in the ADC 305 and the sample sequence therefrom is supplied to the two tap acquisition FIR equalizing filter 315. The equalized sample sequence from the acquisition FIR filter is applied to the acquisition timing control 325 in which estimated sample values are generated. The acquisition timing control 325 operates to minimize the mean squared error between the samples of the equalized sample sequence from the acquisition FIR filter 315 and the estimated signal values. A phase error signal produced in the acquisition timing control 325 is supplied to the PLL 350 via multiplexor 340 to adjust the frequency generated therein. The adjusted frequency output of the PLL 350 controls the timing of the sampling of the signals from the VGA 301 in the ADC 305.

The acquisition gain control 335 receives the equalized sample sequence from the acquisition FIR filter 315 and operates to form a gain error signal by minimizing the mean squared error between the samples of the equalized sample sequence. The gain error signal is supplied to the gain equalizer 355 via the multiplexor 345. In the gain integrator, the gain error signal is integrated over time and the integrated error signal controls the gain of the VGA 301. The acquisition timing control and the acquisition gain control circuitry may be simple arrangements since the signal received by the read channel in the preamble segment is the 4T pattern of FIG. 6b. In addition, according to the invention, the two tap acquisition FIR filter 315 (e.g., FIG. 4 or FIG. 5 has very low latency compared to the tracking FIR filter 310 (e.g., FIG. 2) so that the acquisition timing and gain loops have high bandwidth for rapid synchronization.

Figure 7:
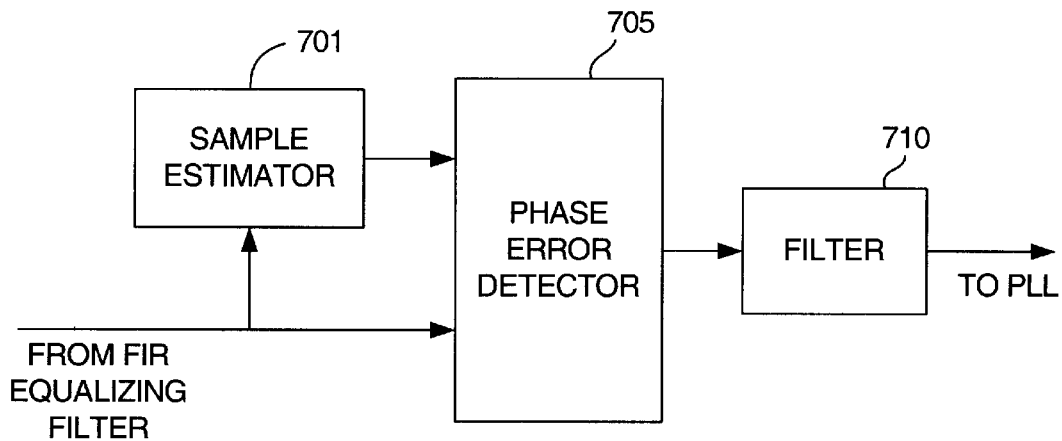
FIG. 7 depicts a timing control circuit that may be used in the read channel of FIG. 3.

A circuit that may be used as the acquisition timing control circuit is shown in FIG. 7 and operates to generate estimated sample values and to adjust the timing of the ADC 305 to minimize the mean squared error between the samples of the equalized sample sequence and the estimated signal values. A circuit that may be used as the acquisition gain control circuit is shown in FIG. 8 and operates to generate estimated sample values and to adjust the gain of the VGA 301 to minimize the mean squared error between the samples of the equalized sample sequence and the estimated signal values.

Referring to the timing control of FIG. 7, there is shown a sample estimator 701, a phase error detector 705 and a filter 710. The equalized sample sequence from the FIR equalizing filter 315 is applied to an input of the sample estimator 701 and to an input of the phase error detector 705. The sample estimator 701 generates estimated sample values corresponding to the read signal samples from the FIR equalizing filter 315 and applies the estimated sample values to the phase error detector 705. The phase error detector 705 receives the equalized sample sequence from FIR equalizing filter 315. The sample estimator and the phase error detector of FIG. 7 operate as disclosed in the aforementioned U.S. Pat. No. 5,585,975 to minimize the mean squared value between the estimated sample values and the read signal sample values according to a well known stochastic gradient algorithm. The output of the phase error detector is supplied to the PLL 350 through the filter 710 and the multiplexor 340.

Figure 8:
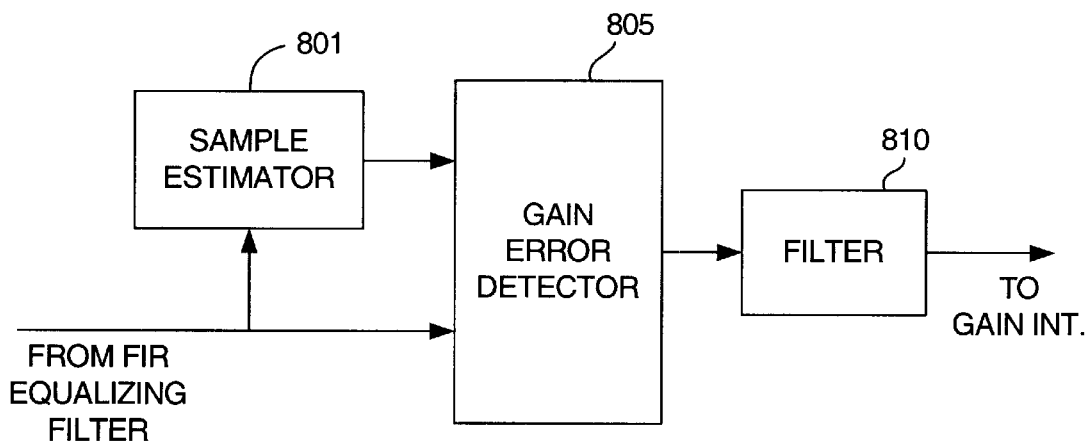
FIG. 8 depicts a gain control circuit that may be used in the read channel of FIG. 3.

Referring to the gain control of FIG. 8, there is shown a sample estimator 801, a gain error detector 805 and a filter 810. The equalized sample sequence from the FIR equalizing filter 315 is applied to an input of the sample estimator 801 and to an input of the phase error detector 805. The sample estimator 801 generates estimated sample values corresponding to the read signal samples from the FIR equalizing filter 315 and applies the estimated sample values to the gain error detector 805. The gain error detector 805 receives the equalized sample sequence from FIR equalizing filter 315. The sample estimator and the gain error detector of FIG. 8 operate as disclosed in the aforementioned U.S. Pat. No. 5,585,975 to minimize the mean squared value between the estimated sample values and the read signal sample values according to a well known stochastic gradient algorithm. The output of the phase error detector is supplied to the gain integrator 355 through the filter 810 and the multiplexor 345.

At the end of the preamble segment, the control signal from the host computer 370 switches the states of the multiplexors 340 and 345, to connect the tracking timing control 320 to the PLL 350 and to connect the tracking gain control 330 to the gain integrator 355. During the data segment 605, the host computer 370 is adapted to receive user data stored on the magnetic medium from the read channel. In the data segment, the tracking FIR equalizing filter 310 provides an equalized sample sequence to the discrete time sequence detector 360. The binary sequence from the discrete time sequence detector 360 is decoded in decoder 365 which may be an RLL decoder that converts the binary sequence inputted thereto to estimated user data. The estimated user data from the decoder 365 is then sent to the host computer 370.

In order to maintain proper timing in the ADC 305 and proper gain in the VGA 301 during the reading of user data in data sector 605, the equalized sample sequence from the tracking FIR filter 310 is applied to the tracking timing control 320 and the tracking timing control 330. The circuit of FIG. 7 may be used as the tracking timing control to operate as described with respect to the acquisition timing control and the circuit of FIG. 8 may be used as the tracking gain control 330 to operate as described with respect to the acquisition gain control.

The estimated signal values in the tracking timing control and the tracking gain control are generated for the large range of waveforms from the user data equalized sample sequence in the user data segment so that the tracking timing and gain control arrangements are more complex than those of the acquisition timing and gain control. A phase error signal formed by the tracking timing control 320 is applied to PLL 350 through the multiplexor 340 to adjust the timing of the samples in the ADC 305. The gain integrator 355 receives the gain error signal from the tracking gain control 335 through the multiplexor 345 and adjusts the gain of the VGA 301.

In the reading of the data segment, the 10 to 20 tap tracking FIR filter 310 provides proper equalization over a wide range of waveforms for accurate data detection. Since the bandwidth required of the timing and gain control loops in the data segment after synchronization has been achieved is low, the read channel remains in a stable state during the data segment. According to the invention, an acquisition FIR filter having short latency performs equalization of the timed sample sequence obtained from reading a magnetic medium in a preamble segment of the sector being read to provide rapid synchronization and a tracking FIR filter equalizes the sampled sequence during the data segment of the sector to provide equalization for a wide range of waveforms.

While the invention has been described in conjunction with a specific embodiment, it is evident to those skilled in the art that many further alternatives, modifications and variations will be apparent in light of the foregoing description. Moreover, it is contemplated that the present invention is not limited to the particular circuit arrangement described and may utilize other appropriate operational amplifier and feedback arrangements. Thus, the invention described herein is intended to embrace all such alternatives, modifications, applications and variations as may fall within the spirit and scope of the appended claims.

What is claimed is:

1. A data channel for processing a signal from a storage medium, comprising:
    means responsive to the signal from the storage medium for forming a timed sample sequence;
    first means responsive to the timed sample sequence during a first segment of the signal for equalizing the timed sample sequence and adjusting the timed sample sequence forming means; and
    second means responsive to the timed sample sequence during a second segment of the signal for equalizing the timed sample sequence and adjusting the timed sample sequence forming means.

2. A data channel for processing a signal from a storage medium according to claim 1,
    wherein the first means includes first filtering means responsive to a set of first parameter signals for equalizing the timed sample sequence during the first segment of the signal and first control means responsive to the equalized timed sample sequence for forming timing and gain adjusting signals to control the timed sample sequence forming means during the first signal segment, and
    wherein the second means includes second filtering means responsive to a set of second parameter signals for equalizing the timed sample sequence during the second segment of the signal, and second control means responsive to the equalized timed sample sequence for forming timing and gain adjusting signals to control the timed sample sequence forming means during the second signal segment.

3. A data channel according to claim 2, wherein a number of first parameter signals is smaller than a number of second parameter signals.

4. A data channel according to claim 3, wherein the first filtering means and the second filtering means form substantially the same equalized timed sample sequence for the signal of the first signal segment.

5. A data channel according to claim 3, wherein each first parameter signal is a linear combination of at least some of the second parameter signals.

6. A data channel according to claim 5, wherein the number of first parameter signals is at least two.

7. A data channel according to claim 5, wherein the second filtering means includes second FIR filtering means and the second parameter signals includes a set of second FIR equalizer coefficient signals $c_0, c_1, c_2, \ldots c_n, c_{n+1}$, and
    wherein the first filtering means includes first FIR filtering means and the first parameter signals includes a set of first FIR equalizer coefficient signals
    $K_0 = f(c_0, c_2, c_4, \ldots c_n)$ and
    $K_1 = f(c_1, c_3, c_5, \ldots c_{n+1})$.

8. A data channel according to claim 7, wherein the first FIR equalizer coefficient signals for forming a substantially same equalized timed sample sequence as the second FIR equalizer coefficient signals for the signal of the first signal segment are
    $K_0 = c_0 - c_2 + c_4 - c_6 \ldots + c_{n-2} - c_n$ and
    $K_1 = c_1 - c_3 + c_5 - c_7 \ldots + c_{n-1} - c_{n+1}$.

9. A data channel according to claim 8, wherein the first FIR equalizer coefficient signals are formed in an initial portion of the first signal segment.

10. A data channel according to claim 7, wherein the first signal segment includes a 4T sinusoid pattern and the timed sample sequence during the first signal segment includes a sequence of samples having values $(s_0, s_1, -s_0, -s_1, \ldots)$ and a target output timed signal sequence of the first FIR equalizer for the first signal segment is of the form $(x_o, x_1, -x_0, -x_1, \ldots)$ and wherein the first FIR equalizer coefficient signals to provide a substantially same response as the second FIR equalizer filter to the first signal segment are $$k_0 = (K_0 * x_1 + K_1 * x_0)/(x_0 * x_0 + x_1 x_1) \text{ and } k_1 = (K_1 * x_1 + K_0 * x_0)/(x_0 * x_0 + x_1 x_1).$$

11. A data channel according to claim 10, wherein the first FIR equalizer coefficient signals are formed in an initial portion of the first signal segment.

12. A data channel according to claim 2, wherein the timed sample sequence forming means comprises amplifying means and sampling means, the first control means comprises first gain control means responsive to the equalized timed sample sequence for adjusting a gain of the amplifying means and first timing control means responsive to the equalized timed sample sequence for adjusting a timing of the sampling means during the first signal segment and the control means comprises second gain control means responsive to the equalized timed sample sequence for adjusting the gain of the amplifying means and second timing control means responsive to the equalized timed sample sequence for adjusting the timing of the sampling means during the second signal segment.

13. A method of processing a signal from a storage medium, comprising the steps of:
    forming a timed sample sequence responsive to the signal from the storage medium;
    equalizing the timed sample sequence and adjusting the forming of the timed sample sequence by a first equalizer and adjuster during a first segment of the signal; and
    equalizing the timed sample sequence and adjusting the forming of the timed sample sequence by a second equalizer and adjuster in a second segment of the signal.

14. A method of processing a signal from a storage medium according to claim 13,
    wherein the equalizing of the timed sample sequence of the first signal segment is performed by filtering the timed sample sequence in a first filter responsive to a first set of parameters and the adjusting of the forming of the timed sample sequence is performed by forming timing and gain adjusting signals in a first control responsive to the equalized timed sample sequence from the first filter; and wherein the equalizing of the timed sample sequence of the second signal segment is performed by filtering the timed sample sequence in a second filter responsive to a second set of parameters and the adjusting of the forming of the timed sample sequence is performed by forming timing and gain adjusting signals in a second control responsive to the equalized timed sample sequence from the second filter.

15. A method of processing a signal from a storage medium according to claim 14, wherein a number of first parameter signals is smaller than a number of second parameter signals.

16. A method of processing a signal from a storage medium according to claim according to claim 15, wherein the first filter and the second filter form substantially the same equalized timed sample sequence for the signal of the first signal segment.

17. A method of processing a signal from a storage medium according to claim 15, wherein each first parameter signal is a linear combination of at least some of the second parameter signals.

18. A method of processing a signal from a storage medium according to claim 17, wherein the number of first parameter signals is at least two.

19. A method of processing a signal from a storage medium according to claim 17, wherein the second filter includes a second FIR filter and the second parameter signals includes a set of second FIR coefficient signals c0, c1, c2, . . . cn, cn+1 that control the second FIR filter, and wherein the first filter includes a first FIR filter and the first parameter signals includes a set of first FIR equalizer coefficient signals K0=f(c0, c2, c4, . . . cn) and K1=f(c1, c3, c5, . . . cn+1) that control the first FIR filter.

20. A method of processing a signal from a storage medium according to claim 19, wherein the first FIR equalizer coefficient signals for forming a substantially same equalized timed sample sequence as the second FIR equalizer coefficient signals for the signal of the first signal segment are K0=c0−c2+c4−c6 . . . +cn−2−cn and K1=c1−c3+c5−C7 . . . +cn−1−cn+1.

21. A method of processing a signal from a storage medium according to claim 20, wherein the first FIR equalizer coefficients are formed in an initial portion of the first signal segment.

22. A method of processing a signal from a storage medium according to claim 20, wherein the first signal segment includes a 4T sinusoid pattern and the timed sample sequence during the first signal segment includes a sequence of samples having values (s0, s1, −s0, −s1, . . . ) and a target output timed signal sequence of the first FIR equalizer for the first signal segment is of the form (xo, x1, −x0, −x1, . . . ) and wherein the first FIR equalizer coefficient signals for controlling the first FIR filter to provide a substantially same response as the second FIR equalizer filter to the first signal segment are $k0=(K0*x1+K1*x0)/(x0*x0+x1x1)$ and $k1=(K1*x1+K0*x0)/(x0*x0+x1x1)$.

23. A method of processing a signal from a storage according to claim 22, wherein the first FIR equalizer coefficients are formed in an initial portion of the first signal segment.

24. A method of processing a signal from a storage medium according to claim 14, wherein the timed sample sequence forming is performed by an amplifier and a sampler, the adjusting of the forming of the timed sample sequence in the first signal segment is performed by a timing control responsive to the equalized timed sample sequence from the first filter to control sampling in the sampler and by a gain control responsive to the equalized timed sample sequence from the.first filter to control the gain of the amplifier and the adjusting of the forming of the timed sample sequence in the second signal segment is performed by a timing control responsive to the equalized timed sample sequence from the second filter to control sampling in the sampler and by a gain control responsive to the equalized timed sample sequence from the second filter to control the gain of the amplifier.

25. A data channel for processing a signal from a storage medium, comprising:

a converter responsive to the signal from the storage medium for forming a timed sample sequence;

a first processing circuit responsive to the timed sample sequence during a first segment of the signal for equalizing the timed sample sequence and adjusting the converter; and a second processing circuit responsive to the timed sample sequence during a second segment of the signal for equalizing the timed sample sequence and adjusting the converter.

26. A data channel for processing a signal from a storage medium according to claim 25, wherein the first processing circuit includes a first filter responsive to a set of first parameter signals for equalizing the timed sample sequence during the first segment of the signal and a first control responsive to the equalized timed sample sequence for forming timing and gain adjusting signals to control the converter for forming the timed sample sequence during the first signal segment, and wherein the second processing circuit includes a second filter responsive to a set of second parameter signals for equalizing the timed sample sequence during the second segment of the signal, and a second control responsive to the equalized timed sample sequence for forming timing and gain adjusting signals to control the converter for forming the timed sample sequence during the second signal segment.

27. A data channel according to claim 26, wherein a number of first parameter signals is smaller than a number of second parameter signals.

28. A data channel according to claim 27, wherein the first filter and the second filter form substantially the same equalized timed sample sequence for the signal of the first signal segment.

29. A data channel according to claim 27, wherein each first parameter signal is a linear combination of at least some of the second parameter signals.

30. A data channel according to claim 29, wherein the number of first parameter signals is at least two.

31. A data channel according to claim 29, wherein the second filter includes a second FIR filter and the second parameter signals includes a set of second FIR equalizer coefficient signals c0, c1, c2, . . . cn, cn+1 for controlling the second FIR filter, and wherein the first filter includes a first FIR filter and the first parameter signals include a set of first FIR equalizer coefficient signals K0=f(c0, c2, c4, . . . cn)

K1=f(c1, c3, c5, . . . cn+1) for controlling the first FIR filter.

32. A data channel according to claim 31, wherein the first FIR equalizer coefficient signals for forming a substantially same equalized timed sample sequence as the second FIR equalizer coefficient signals for the signal of the first signal segment are K0=c0−c2+c4−c6 . . . +cn−2−cn and K1=c1−c3+c5−c7 . . . +cn−1−cn+1.

33. A data channel according to claim 32, wherein the first FIR equalizer coefficients are formed in an initial portion of the first signal segment.

34. A data channel according to claim 32, wherein the first signal segment includes a 4T sinusoid pattern and the timed sample sequence during the first signal segment includes a sequence of samples having values (s0, s1, −s0, −s1, . . . ) and a target output timed signal sequence of the first FIR equalizing filter for the first signal segment is of the form (x0, x1, −x0, −x1, . . . ) and wherein the first FIR equalizer coefficient signals to provide a substantially same response as the second FIR equalizing filter to the first signal segment are $$k0=(K0*x1+K1*x0)/(x0*x0+x1x1) \text{ and } k1=(K1*x1+K0*x0)/(x0*x0+x1x1).$$

35. A data channel according to claim 34, wherein the first FIR equalizer coefficients are formed in an initial portion of the first signal segment.

36. A data channel according to claim 26, wherein the converter comprises an amplifier and sampler, the control comprises a first timing control responsive to the equalized timed sample sequence in the first signal segment for adjusting the timing of the sampler and a first gain control for adjusting the gain of the amplifier and the second control comprises a second timing control responsive to the equalized timed sample sequence in the first signal segment for adjusting the timing of the sampler and a second gain control for adjusting the gain of the amplifier.

\* \* \* \* \*